(12) United States Patent
Gaugler et al.

(10) Patent No.: US 10,147,958 B2
(45) Date of Patent: Dec. 4, 2018

(54) ELECTROCHEMICAL SYSTEM

(71) Applicant: REINZ-Dichtungs-GmbH, Neu-Ulm (DE)

(72) Inventors: Bernd Gaugler, Ulm (DE); Joachim Scherer, Ulm (DE); Bernadette Gruenwald, Ulm (DE); Raimund Stroebel, Ulm (DE)

(73) Assignee: Reinz-Dichtungs, GmbH, Neu-Ulm (DE)

( * ) Notice: Subject to any disclaimer, the term of this patent is extended or adjusted under 35 U.S.C. 154(b) by 199 days.

(21) Appl. No.: 15/117,986

(22) PCT Filed: Mar. 16, 2015

(86) PCT No.: PCT/EP2015/055457
§ 371 (c)(1),
(2) Date: Aug. 10, 2016

(87) PCT Pub. No.: WO2015/140114
PCT Pub. Date: Sep. 24, 2015

(65) Prior Publication Data
US 2017/0012300 A1   Jan. 12, 2017

(30) Foreign Application Priority Data
Mar. 18, 2014   (DE) .................. 20 2014 002 512 U

(51) Int. Cl.
*H01M 8/02*         (2016.01)
*H01M 8/0273*      (2016.01)
(Continued)

(52) U.S. Cl.
CPC ......... *H01M 8/0273* (2013.01); *H01M 8/028* (2013.01); *H01M 8/0271* (2013.01);
(Continued)

(58) Field of Classification Search
None
See application file for complete search history.

(56) References Cited

U.S. PATENT DOCUMENTS 6,319,973 B1   11/2001   Lemm et al.
6,696,185 B1 *  2/2004   Okamoto ............ H01M 8/0228
                                              429/470
(Continued)

FOREIGN PATENT DOCUMENTS

DE   19833063 A1   2/2000
DE   20308332 U1   3/2004
(Continued)

OTHER PUBLICATIONS

International Search Report and Written Opinion for Application No. PCT/EP2015/055457, dated Jun. 15, 2015, issued by the European Patent Office.

*Primary Examiner* — Scott J. Chmielecki
(74) *Attorney, Agent, or Firm* — Marshall & Melhorn, LLC

(57) ABSTRACT

An electrochemical system has at least one endplate, a terminal bipolar plate as well as a sealing device arranged between the endplate and the terminal bipolar plate. The materials of the terminal bipolar plate and the endplate have different coefficients of thermal expansion and with the sealing device being designed in such a way that during temperature changes, the sealing function is also given by a sliding of the endplate and/or the terminal bipolar plate along the sealing device.

24 Claims, 11 Drawing Sheets

(51) Int. Cl.
*H01M 8/0271* (2016.01)
*H01M 8/028* (2016.01)
*H01M 8/0276* (2016.01)
*H01M 8/2485* (2016.01)
*H01M 8/0282* (2016.01)
*H01M 8/0284* (2016.01)
*H01M 8/0286* (2016.01)
*H01M 8/2483* (2016.01)

(52) U.S. Cl.
CPC ....... *H01M 8/0276* (2013.01); *H01M 8/0282* (2013.01); *H01M 8/0284* (2013.01); *H01M 8/0286* (2013.01); *H01M 8/2483* (2016.02); *H01M 8/2485* (2013.01)

(56) References Cited

U.S. PATENT DOCUMENTS

| | | |
|---|---|---|
| 2004/0086769 A1 | 5/2004 | Diez |
| 2007/0231619 A1 | 10/2007 | Strobel et al. |
| 2007/0238004 A1* | 10/2007 | Osenar ............... H01M 8/0286 429/434 |
| 2008/0182157 A1* | 7/2008 | Visco .................... H01B 1/122 429/50 |
| 2008/0220312 A1 | 9/2008 | Kato |
| 2009/0081527 A1* | 3/2009 | He ...................... H01M 4/8657 429/482 |
| 2009/0253023 A1 | 10/2009 | Hayashi et al. |
| 2011/0079966 A1 | 4/2011 | Fleury et al. |
| 2013/0279113 A1* | 10/2013 | Brandenburg ..... H05K 7/20927 361/699 |
| 2014/0272661 A1* | 9/2014 | Goebel ................. H01M 8/242 429/457 |
| 2015/0037702 A1* | 2/2015 | Osada ................ B60L 11/1892 429/452 |

FOREIGN PATENT DOCUMENTS

| | | |
|---|---|---|
| DE | 112006000501 T5 | 1/2008 |
| DE | 112007002574 T5 | 9/2009 |
| EP | 1187243 A2 | 3/2002 |
| JP | 2007179992 A | 7/2007 |
| JP | 2012150961 A | 8/2012 |

* cited by examiner

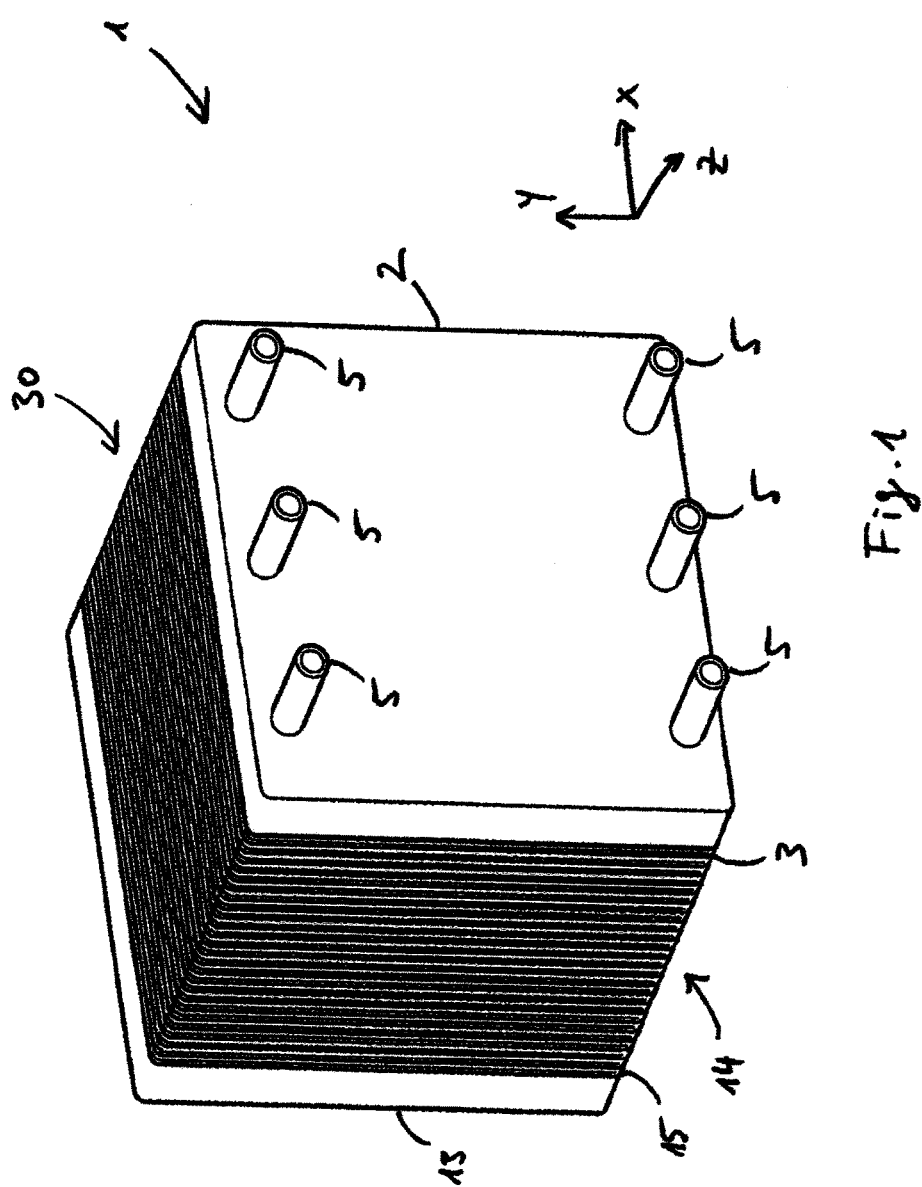

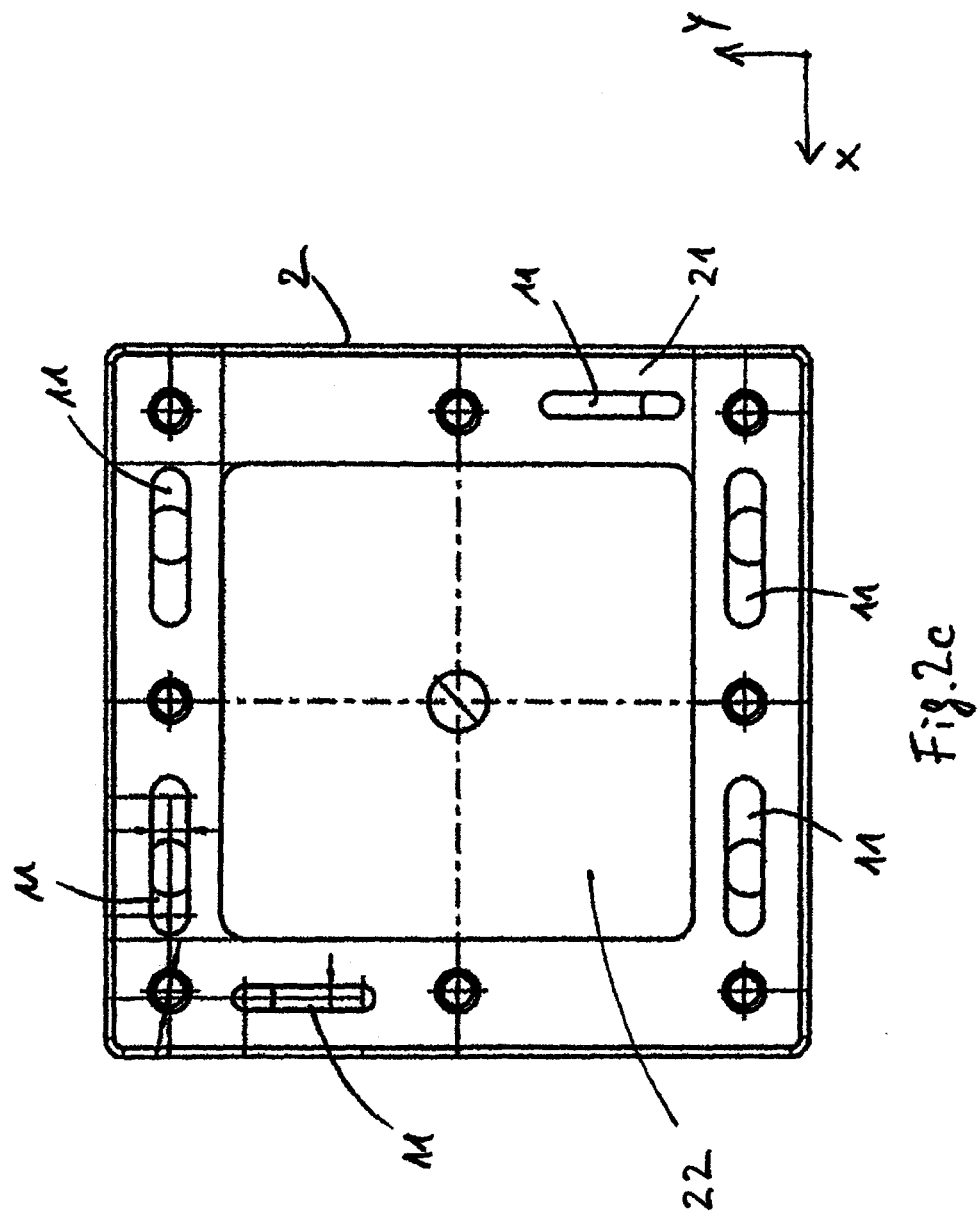

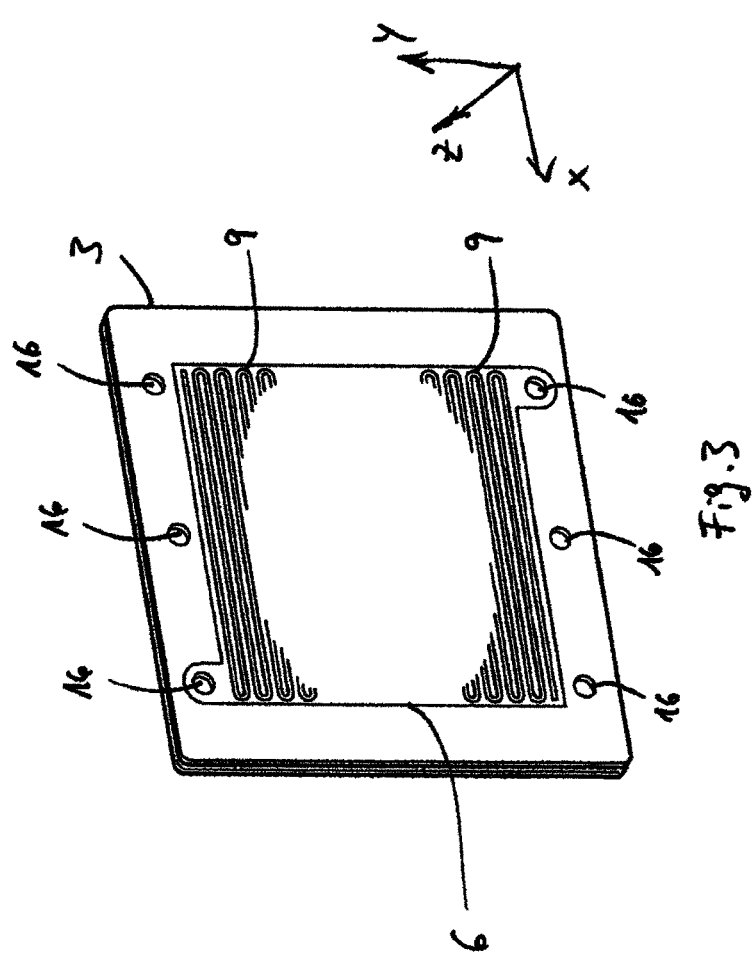

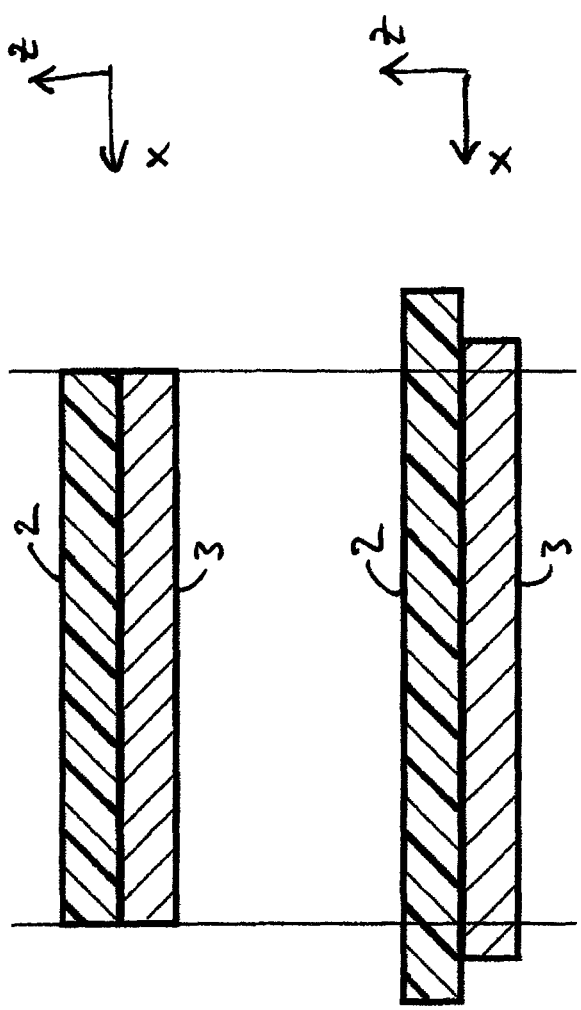

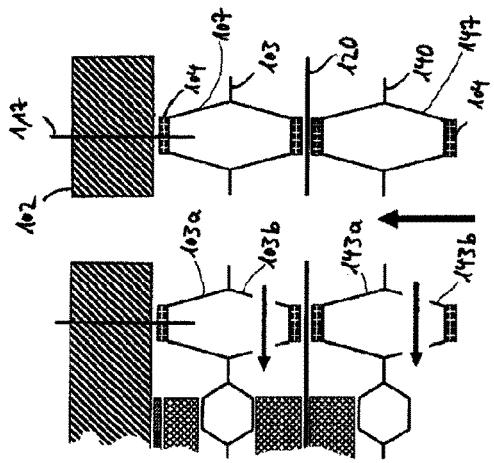
Fig. 5a (Stand der Technik)
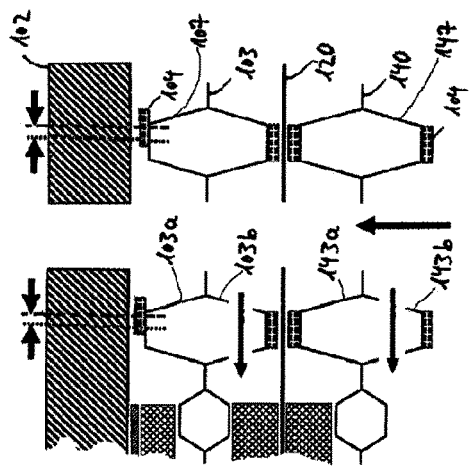
Fig. 5b (Stand der Technik)
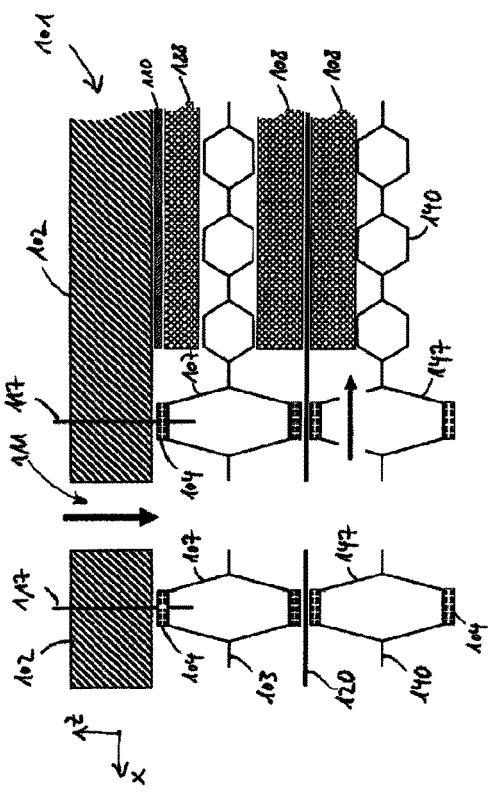
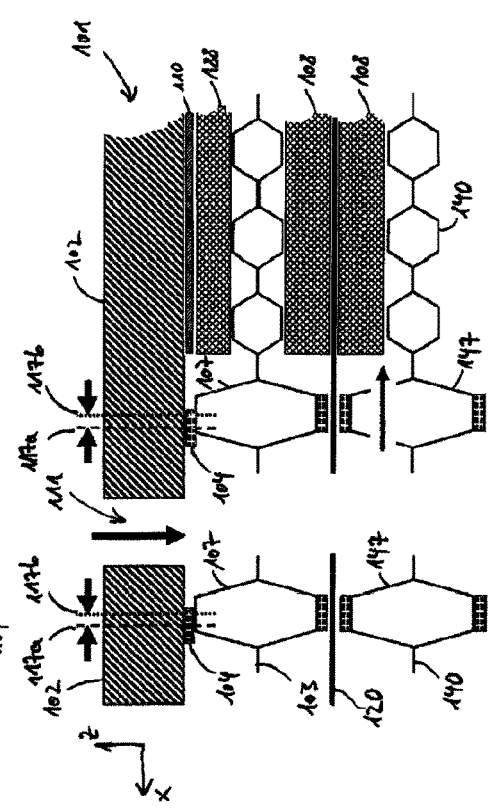

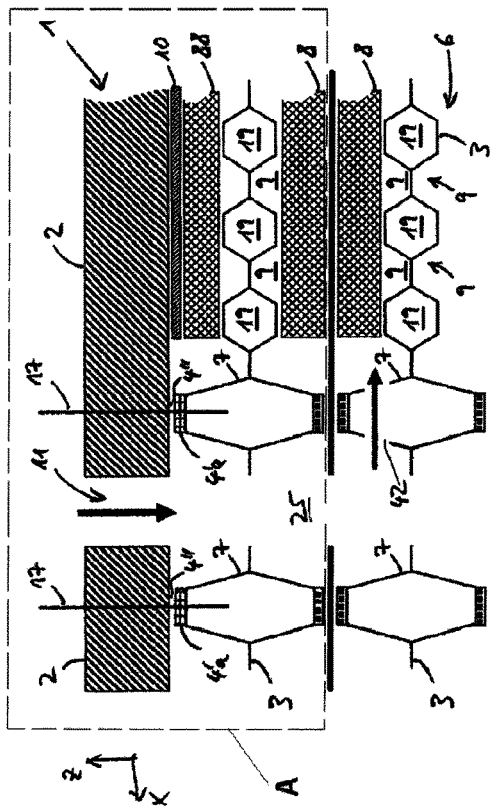
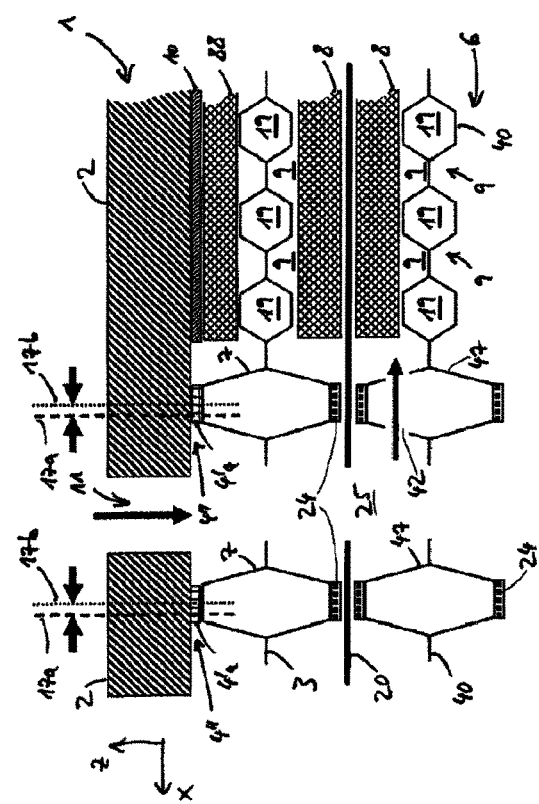
Fig. 6a
Fig. 6b

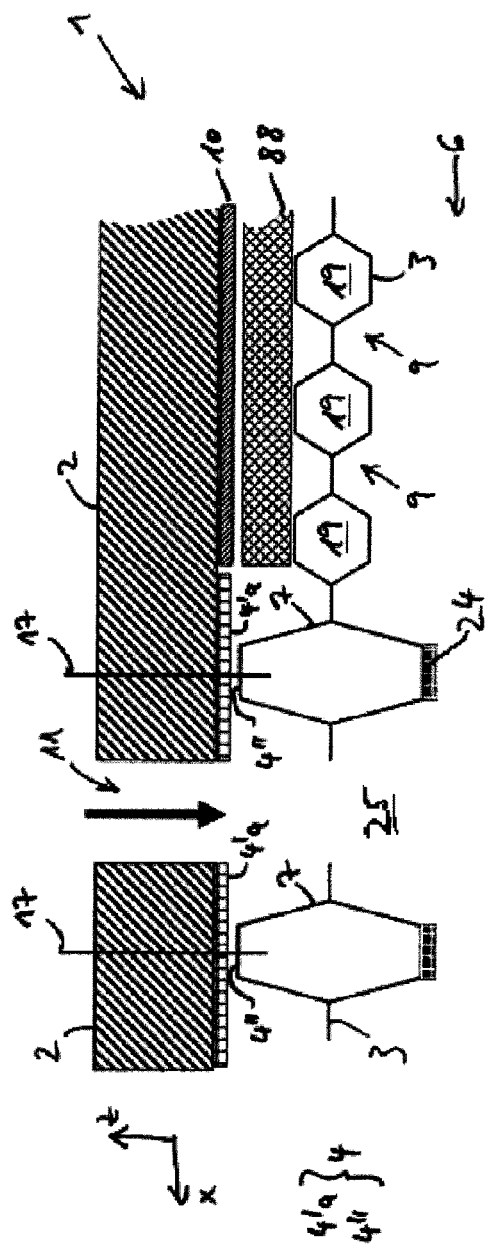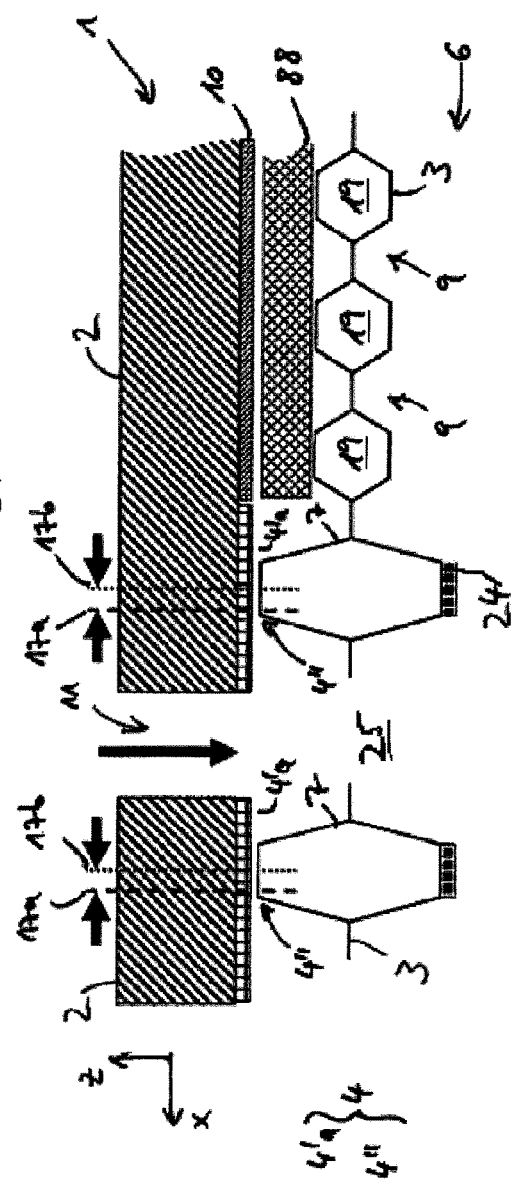

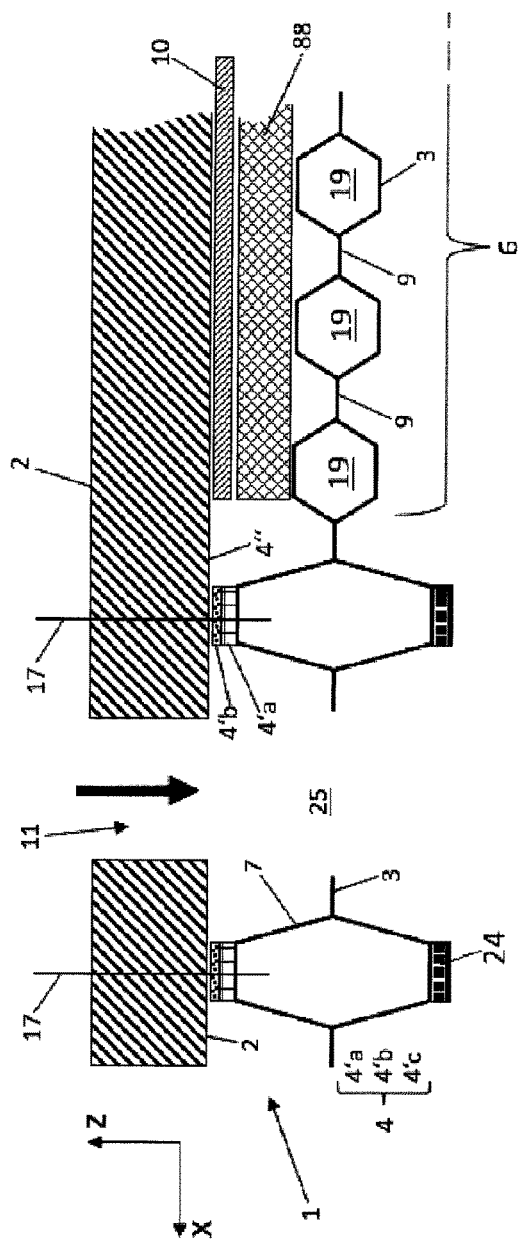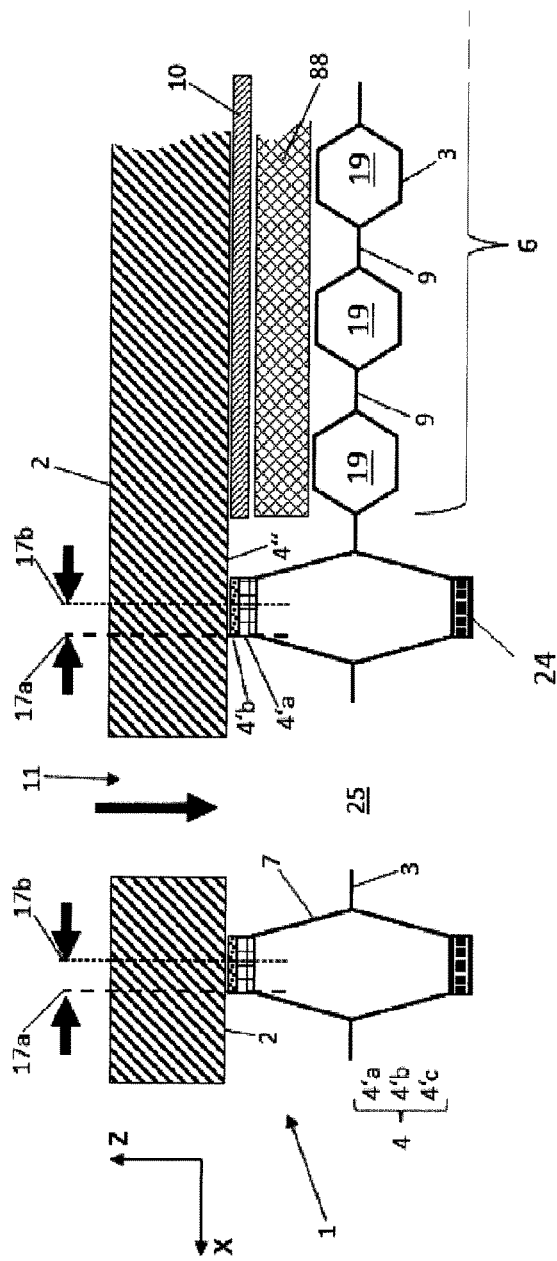

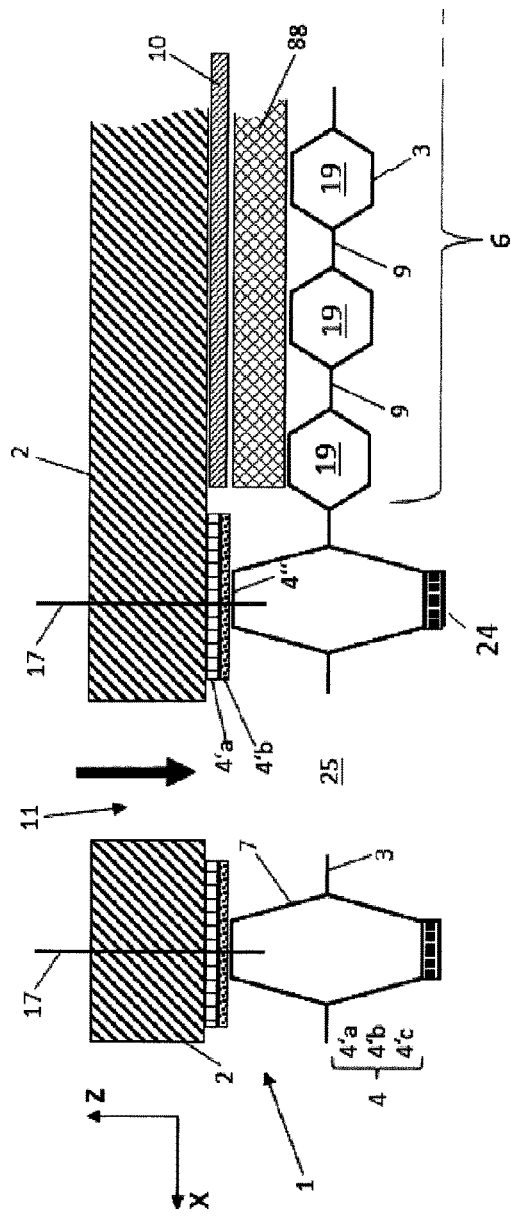
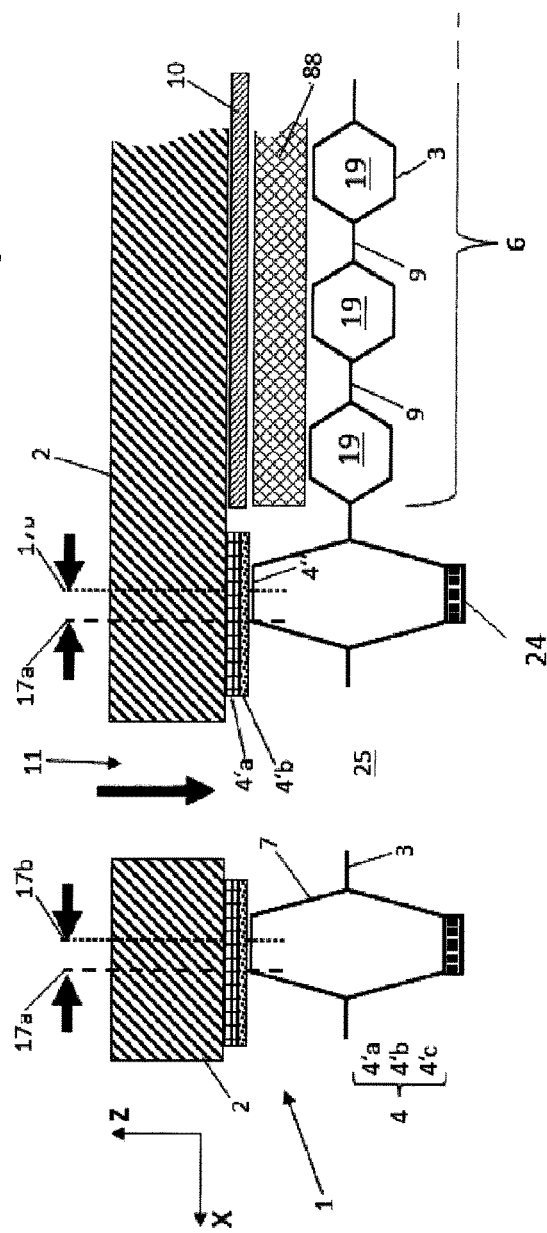

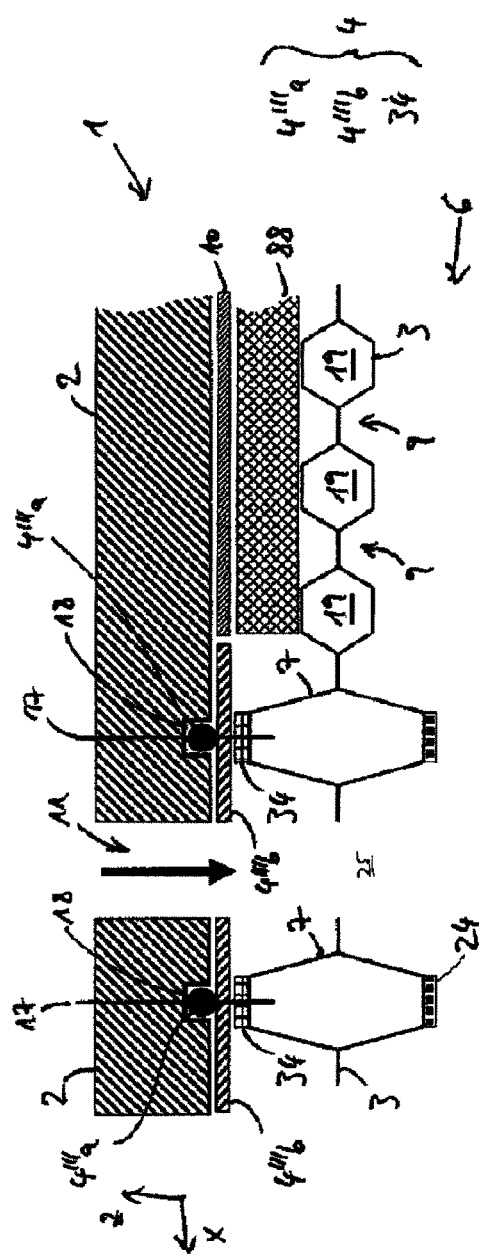
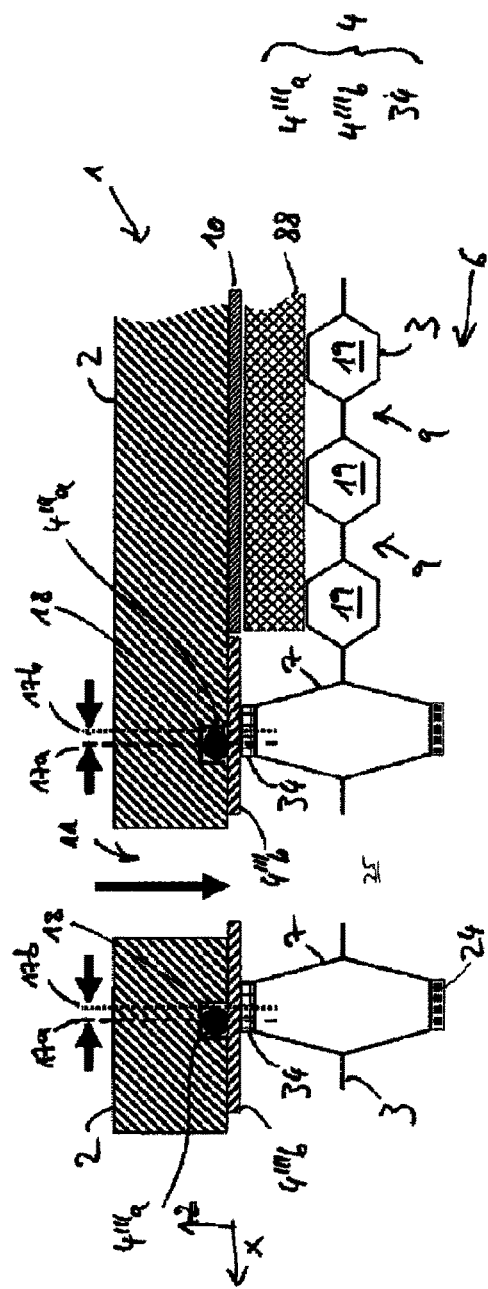

ELECTROCHEMICAL SYSTEM

BACKGROUND OF THE INVENTION

The invention relates to an electrochemical system, which comprises at least one endplate, one terminal bipolar plate as well as at least one sealing device arranged between the endplate and the terminal bipolar plate.

Known electrochemical systems of the kind mentioned are for instance fuel cell systems or electrochemical compressor systems, in particular electrolyzers. Known electrolyzers are for instance designed in such a way that upon application of an electrical potential, in addition to the production of hydrogen and oxygen from water, these gases area simultaneously compressed to higher pressure. In addition to this, electrochemical compressor systems such as electrochemical hydrogen compressors are known which are supplied with gaseous molecular hydrogen and in which this hydrogen is electrochemically compressed by the application of an electrical potential. This kind of electrochemical compression is particularly suited for small amounts of hydrogen to be compressed, since a mechanical compression of the hydrogen in this situation would be considerably more elaborate.

Further electrochemical systems are known which comprise a stack of electrochemical cells, which each are separated by bipolar plates. Such bipolar plates may for instance serve for the electrical contacting of the electrodes of the individual electrochemical cells (such as fuel cells) and/or the electrical connection of neighboring cells in case of a serial connection of the cells. The bipolar plates may further comprise a channel structure or form a channel structure, which is provided for the supply of the cells with one or several media (e.g. hydrogen, air and coolant) and/or the removal of reaction products and/or cooling media. These media can be fuels (e.g. hydrogen or methanol) or reaction gases (e.g. air or oxygen) or coolant. Such a channel structure is usually arranged in an electrochemically active area of the cell, thereby forming the flow field of the bipolar plate. It is sometimes also referred to as gas distribution structure. Further, these bipolar plates can be designed for the transport of the heat produced during the transformation of electrical or chemical energy in the electrochemical cell as well as for the sealing of the different reaction media or coolant channels against each other and towards the outside.

The bipolar plates may for instance comprise openings, through which the media and/or the reaction products and/or coolant are guided to or from the electrochemical cells arranged between the bipolar plates of the stack adjoining each other. These electrochemical cells may for instance each comprise one or several membrane-electrode assemblies, usually abbreviated as MEA. The MEA may comprise at least one electrolyte membrane and at least one electrode, preferably one electrode on both its sides. Further, two gas diffusion layers, abbreviated as GDLs, are situated adjacent to the MEA; these GDLs are usually oriented towards the bipolar plates and realized as metallic or carbon fleece or carbon paper.

Bipolar plates are usually constructed from two independent plates which are connected to each other at least in sections. In the following these independent plates are referred to as half plates.

In general, the stack comprising the bipolar plates and the electrochemical cells is terminated at both its ends by an endplate. At least one of the endplates typically comprises one or several ports. The pipes for the supply of the media and/or the removal of the reaction products may be connected to these ports. In addition, at least one of the endplates usually comprises electrical connections, via which the cell stack can be electrically connected to an electrical load or a source of electrical voltage. The bipolar plate of the stack situated closest or adjacent to such an endplate is also referred to as terminal bipolar plate.

No medium is guided between the terminal bipolar plate and the endplate which goes along with no electrochemical reaction taking place in this interspace. As a consequence, no proton-conductive membrane is arranged between the terminal bipolar plate and the endplate. Rather, the current collector is arranged in this interspace. It is therefore not surprising that in most electrochemical stacks, the terminal bipolar plate(s) are designed different from the repeating bipolar plates in the stack. This is especially true with respect to the supply of media from the ports to the surface of the terminal bipolar plate facing the endplate. As no medium has to be provided to this interspace, no passage is provided on this surface. In contrast, each nonterminal bipolar plate comprises passage which allow for the passage of media from the ports to the corresponding surfaces of the bipolar plate. The same is true for the other surface of the terminal bipolar plate. Thus, both half plates of "ordinary" bipolar plates comprise passages from the ports to the flow field, while only one half plate of the terminal bipolar plate, namely the one facing the bipolar plate stack, comprises a passage from a port to the flow field.

A sealing device is typically arranged between the terminal bipolar plate and the endplate. It serves for the sealing of the system to the outside and/or the sealing of various pipes or sections of the electrochemical system against each other. The sealing between the terminal bipolar plate and the endplate in known systems is for instance realized by metallic beads, which are preferably one-piece with the terminal bipolar plate and screen-printed micro-seal coating applied to the bead. However, this screen-printed material tends to stick in particular to the mechanically treated, at least slightly rough plastic surfaces of the endplates. It is also possible that the sealing device is removed from the metallic bead or destroyed if the terminal bipolar plate and the end plate, which in general are produced from different material and therefore both have different coefficients of thermal expansion, are moving relative to each other, in particular laterally, thus in the direction orthogonal to the stack direction, as a consequence of changes in temperature of the electrochemical system. The bipolar plates and therefore also the terminal bipolar plate are formed from metal, e.g. stainless steel, while the endplate is produced from plastics or essentially from plastic. In some applications, the sealing device has to reliably function in the same manner in a temperature range between a minimum temperature of e.g. −40° C. and a maximum temperature of e.g. +100° C. Such temperature changes are especially encountered between the operation start of the fuel cell system being at environmental temperature especially the cold start at negative ambient temperatures in winter and transition to the maximum operation temperature of the stack. The consequences of the removal and sticking of the coating is particularly obvious when the stack is demounted, as the coating due to the prior removal is torn away from the terminal bipolar plate.

In order to avoid or at least reduce this relative shift during temperature change, the endplate might also be constructed from metal. However, this both increases the production cost and the weight of the system, which is not desired for many applications. On the other hand, the sealing of the interface between the endplate and the terminal bipolar plate with rubber gaskets, e.g. O-ring seals or so called floppy gaskets, which are partly seated in at least one of the plates, can lead to difficulties with the adjustment of the height and force of the sealing system due to the strong settling of such gaskets.

SUMMARY OF THE INVENTION

It is therefore the object of the present invention to provide for an electrochemical system with a sealing device arranged between a terminal bipolar plate and an endplate, where the sealing device shows longevity even with pronounced changes in temperature. Further, the production of the system shall be as simple and cost-effective as possible.

This object is solved by an independent electrochemical system claim. Particular embodiments of the system are described in the dependent claims.

The invention therefore proposes an electrochemical system with at least one endplate, a terminal bipolar plate as well as with at least one sealing device arranged between the endplate and the terminal bipolar plate, where the terminal bipolar plate and the endplate consist in materials having different coefficients of thermal expansion. The sealing device is preferably designed in such a way that the sealing function between the sealing device and the endplate during temperature changes is accomplished only or at least in part by sliding of the endplate and/or the terminal bipolar plate along the sealing device.

The sealing function thus is not only or at least not exclusively maintained via a deformation of the sealing device. To this end, the sealing device is preferably designed in such a way that the ratio between a clamping force and a frictional force between the sealing device and the endplate and/or between the sealing device and the terminal bipolar plate is characterized by a coefficient of static friction and/or the coefficient of sliding friction t, which is smaller than a threshold. The threshold for the static friction may for instance have a value of 1.0, 0.8, 0.6, 0.4 or 0.2. As an alternative, one can also fix a threshold value for the sliding friction of 1.0, 0.8, 0.6, 0.4 or 0.2.

Usually, temperature changes cause a relative shift of the terminal bipolar plate and the endplate orthogonal to the stack direction or the stack axis, and therefore parallel to the plane of the plate of the terminal bipolar plate of the endplate occurs. Typically, the terminal bipolar plate and the endplate during temperature increase expand in the respective plate plane approximately concentrically relative to the center point of the respective plate. Correspondingly, they contract during reduction of the temperature in the respective plane of plate approximately concentrically to the center point of the respective plate. The relative shift of the terminal bipolar plate and the endplate therefore is usually also approximately star-shaped in various lateral directions. The sealing device according to the invention is therefore designed in such a way that the sealing function is in particular realized by a sliding along this shifting direction. This way, the shearing forces transmitted to the sealing device during temperature change, which cause a deformation of the sealing device and as a consequence can result in a considerable fatigue of the material of the sealing device, are reduced or inhibited. In order to fulfill its sealing function, the sealing device is usually in immediate contact both with the endplate and the terminal bipolar plate, however, in any case with at least one of these two plates.

The electrochemical system can for instance be a fuel cell system, an electrochemical compressor or an electrolyzer. Usually, the electrochemical system comprises two endplates and a plurality of bipolar plates arranged between these two endplates. Therefore, the system then comprises two terminal bipolar plates, each directly neighboring the respective endplate.

The sealing device may be arranged in the area around at least one port and/or around an electrochemically active area of the terminal bipolar plate. The sealing device may also be arranged around corresponding areas or portions of the endplate, which correspond to the projection of the electrochemically active area of the terminal bipolar plate to the endplate in the direction of the stack. The sealing device or sealing elements of the sealing device may extend completely or only partially over the surface of the endplate and/or the terminal bipolar plate. In an embodiment which is particularly simple to produce, the sealing device is designed in such a way that it does not pass through the endplate. The sealing device is thus preferably arranged completely on the side of the endplate which faces the terminal bipolar plate.

In a particular embodiment, the sealing device may be realized as a one- or multi-layered coating of the endplate and/or the terminal bipolar plate or comprise such a coating. This way, the sliding along the shifting direction during temperature changes can be realized particularly effective and in a simple manner. The material of the coating may for instance comprise fluoropolymers, graphite and/or $MoS_2$. The coating may for instance be laminated or glued onto the endplate and/or the terminal bipolar plate. The coating may for instance comprise a polymer film, preferably from PTFE, PI Kapton® and/or polyester. The coating can also be realized as a screen printed coating or comprise such. In order to improve the sliding properties of the screen-printed coating, it may then comprise additives which improve the sliding behavior, such as graphite, PTFE, waxes, fluorinated waxes, silicones and/or silicon oils.

In order to improve the adhesion of the screen printing on the endplate or the terminal bipolar plate, respectively, additional contact layers like adhesives may be provided. To this end, the screen printing may be provided with a primer, preferably a primer layer. In order to improve the adhesion of the screen printing, the respective surface of the endplate or terminal bipolar plate, respectively, may additionally be treated using a corona or plasma process or with active plasma, meaning that precursors are added, which react in the plasma to form adhesion promoting layers on the surface. Further, the curing of the screen printing may be increased by photocrosslinking, crosslinking by plasma or chemical crosslinking.

In a further embodiment of the invention, the sealing device may be realized as a structuring of the endplate and/or the terminal bipolar plate, in particular as a structuring of a surface of the terminal bipolar plate facing the endplate and/or as a structuring of a surface of the endplate facing the terminal bipolar plate in order to reduce the frictional resistance. It is of course possible that the sealing device comprises both the coating mentioned and the structuring mentioned. E.g. the terminal bipolar plate may be coated and the endplate be structured or vice versa. The structuring can be realized using ablating methods, in particular by grinding, lapping, polishing, electropolishing and/or honing.

In a further particular embodiment of the system, the sealing device comprises a sealing element that is at least partly inset into the endplate and further comprises an intermediate plate, with the sealing element and the intermediate plate being arranged in such a way that the sealing element can slide on the intermediate plate and vice versa. It is of course possible that this embodiment is combined with the ones mentioned beforehand, where the sealing device comprises the coating and/or the structuring. The intermediate plate is typically also arranged between the terminal bipolar plate and the endplate. It is preferred that the coefficient of thermal expansion of the intermediate plate is identical or essentially identical to the coefficient of thermal expansion of the terminal bipolar plate. The two coefficients for example have a difference of less than 10 percent, less than 5 percent or less than 2 percent.

The sealing between the intermediate plate and the endplate can be realized using molded-in and/or inserted sealing systems, in particular polymer-based sealing systems, in particular in a hard-stop arrangement, which means that the compression of the sealing system is essentially limited to the elastic range. The sealing element may for instance be formed as a ring, tangential rings or a chain of rings. The intermediate plate may extend over the entire surface of the terminal bipolar plate or be realized as a frame around the active area of the terminal bipolar plate. If the intermediate plate extends over the entire surface or essentially over the entire surface of the terminal bipolar plate, the intermediate plate preferably comprises the current collector, through which an electrical connection to the electrochemical cells can be established, which electrochemical cells are typically between the endplates. If the intermediate plate is realized as a frame, a separate current collector may be provided, e.g. as a current collector plate. The intermediate plate and/or the current collector plate are essentially made from metal.

The endplate is preferably made from plastic because of the advantages in weight and/or volume. In any case, it is preferred if the endplate comprises at least a basic body from plastic. In contrast, the terminal bipolar plate is usually completely or to the largest extent from metal, e.g. from stainless steel. The terminal bipolar plate may in particular be realized as an embossed metal part. In order to improve its electric conductivity, different coatings may be applied to the bipolar plates, in particular to the terminal bipolar plates, and/or to the endplate, e.g. as metal layers. Possible coatings are coatings from noble metals, e.g. from gold, preferably with a coating thickness of less than 1 μm. Other possible coatings are coatings from carbon, in particular from graphite, preferably with a coating thickness of up to 20 μm. Further options are coatings which are applied using processes like PVD and/or CVD and consist of different metals which are deposited to the surface as oxides, nitrides or other ceramic type compounds. These coatings are primarily applied in the electrochemically active areas and not necessarily in the sealing area.

As a consequence, the coefficient of thermal expansion of the terminal bipolar plate is therefore usually smaller than the coefficient of thermal expansion of the endplate. The coefficient of thermal expansion of the terminal bipolar plate may have a value between $5 \cdot 10^{-6}$ $K^{-1}$ and $3 \cdot 10^{-5}$ $K^{-1}$, preferably between $10^{-5}$ $K^{-1}$ and $2 \cdot 10^{-5}$ $K^-$. This is for instance true for a large variety of metals. The coefficient of thermal expansion of the endplate may be larger than $4 \cdot 10^{-5}$ $K^{-1}$, preferably larger than or equal to $5 \cdot 10^{-5}$ $K^{-1}$. This is for instance true for many polymer materials. If the terminal bipolar plate or the endplate is not produced from one homogenous material, but comprises for instance a combination of materials, the coefficient of thermal expansion relates to the coefficient of thermal expansion of that part of the terminal bipolar plate or of the endplate, respectively, which faces the respective other plate and essentially adjoins to the sealing device. It is in fact the sections of the terminal bipolar plate and the endplate facing each other, which essentially determine their shift relative to each other.

The sealing device is preferably designed in such a way that at a contact area between the terminal bipolar plate and the sealing device, sliding of the terminal bipolar plate along the sealing device or vice versa equilibrates a lateral expansion of up to 8 permille of the largest lateral extension of the terminal bipolar plate while maintaining its sealing function. The sealing function of the sealing device is thus preferably still given even though the relative shift between the terminal bipolar plate and the endplate amounts to 8 permille of the largest lateral extension of the terminal bipolar plate. It is preferred that this is given within a temperature range of −40° C. to +100° C.

The sealing device according to the invention mainly has to balance shifts of the terminal bipolar plate relative to the endplate which are due to temperature changes. As both the endplate made from plastics and the metallic terminal bipolar plate are inert against the absorption of water, no swelling occurs so that no swelling needs to be balanced by the sealing device.

The sealing device on the one hand may be designed in such a way that it is or can be put into contact with a bead of the terminal bipolar plate. On the other hand, the sealing device may for instance completely or at least partly be applied on the bead.

As the height of the bead of a bipolar plate depends on the height of the gas diffusion layer or on the height of the MEA in the active area, it is required that the height is equilibrated for on the side of the terminal bipolar plate facing the endplate, as in this area, no MEA is provided. It is therefore preferred that an additional element is arranged between the endplate and the terminal bipolar plate in order to adapt the height in the stack direction, thus in the direction of the stack axis. To this end, one can use for instance one or several gas diffusion layers, as they are usually arranged in a fuel cell stack between the bipolar plates and the MEA. At the same time, these gas diffusion layers serve for the transmission of compression force from the endplate to the active area of the stack as well as for the guidance of electrical current from the stack to the current collector in the endplate.

In order to guide media, e.g. fluids such as fuels or reaction gases and/or for the guidance of reaction products, the terminal bipolar plate may comprise meandering, linear and/or wave-shaped channels in an electrochemically active area. The endplate may comprise passage bores which allow the supply of such fluids to the ports of the stack, in particular to an electrochemically active area of the terminal bipolar plate. They then usually fluidly communicate with corresponding connectors on the outside of the endplate. The fluids can then be supplied to the system or fed away from the system through these passage bores in the endplates and ports in the bipolar plates and terminal bipolar plates. At least one of these passage bores may for instance comprise a reinforcing insert, e.g. from metal. The reinforcing insert extends in the direction essentially parallel to the axis of the stack, but it is preferred if the insert does not extend over the complete height or thickness of the endplate. It may therefore be inserted from the surface of the endplate to which it extends, which depending on the actual embodiment may be the outer surface of the endplate or the surface facing the terminal bipolar plate. The reinforcing insert may be overmolded inside of the passage bore, glued, embedded or inserted. It is however also possible that the passage bores comprise no reinforcing insert.

BRIEF DESCRIPTION OF THE DRAWINGS

Embodiments of the electrochemical system proposed here are illustrated in the drawings and explained in detail in the following description. These drawings only serve for the explanation of preferred embodiments of the invention without the invention being limited to them. In the drawings, identical parts are referred to with identical reference numbers. The drawings in addition to the essential characteristics of the present invention laid down in the independent claims also comprise optional and advantageous enhancements in varying combinations. Each individual one of these advantageous and/or optional enhancements of the invention can vary the invention given in the independent claims, also apart from any combination with one, several or all of the optional and/or advantageous enhancements simultaneously given in the examples. The invention is not limited to the embodiments depicted. It is shown in FIG. 1: A schematic embodiment of an electrochemical system according to the invention with two endplates and a plurality of bipolar plates arranged between the endplates in a perspective view, with the bipolar plates adjoining to the endplates being terminal bipolar plates;

FIG. 2a-c: A schematic illustrations of one of the endplates of FIG. 1;

FIG. 3: A schematic perspective illustration of a terminal bipolar plate of FIG. 1;

FIG. 4a-b: Schematically the extension or contraction of an endplate or a terminal bipolar plate during temperature change and their relative shift;

FIG. 5a-b: Schematically an electrochemical system according to the state of the art with an endplate, a terminal bipolar plate and a sealing device arranged between the endplate and the terminal bipolar plate, where a shift of the terminal bipolar plate caused by a temperature change causes a displacement of the sealing device which is not desirable;

FIG. 6a-b: Schematically an embodiment of an electrochemical system according to the invention with an endplate, a terminal bipolar plate and a sealing device arranged between the endplate and the terminal bipolar plate, where the sealing device comprises a one-layered coating of the terminal bipolar plate and a structuring of the endplate, so that the endplate and the terminal bipolar plate slide along the sealing device during a change of the temperature;

FIG. 7a-b: Schematically a further embodiment of an electrochemical system according to the invention, where the sealing device comprises a one-layered coating of the endplate and a structuring of the terminal bipolar plate;

FIG. 8a-b: Schematically a further embodiment of an electrochemical system where the sealing device comprises a multi-layered coating of the terminal bipolar plate;

FIG. 8c-d: Schematically a further embodiment of an electrochemical system where the sealing device comprises a multi-layered coating of the endplate; as well as FIG. 9a-b: Schematically a further embodiment of an electrochemical system according to the invention, where the sealing device comprises a sealing element inset into the endplate and an intermediate plate, which are in sliding contact with each other.

Figure 2B:
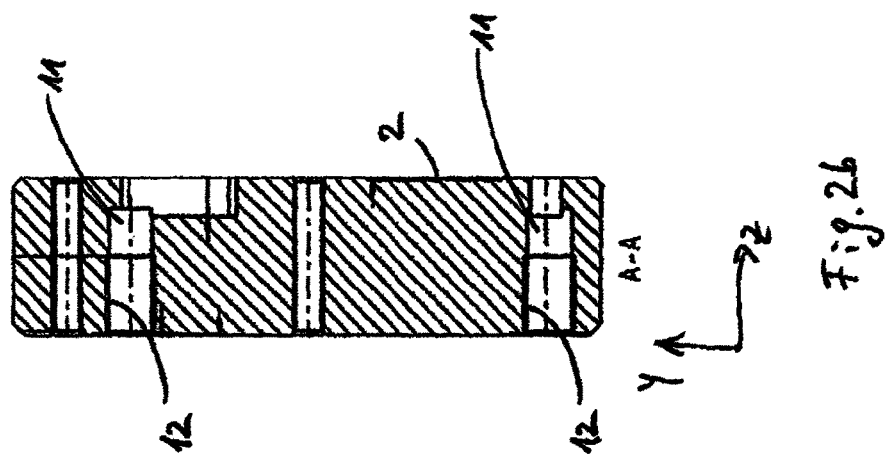

Here and in the following, the same Cartesian coordinate system is used, where the z axis denominates the stack direction and the x and y axis span the plane of the bipolar plates, terminal bipolar plates and endplates.

DETAILED DESCRIPTION OF THE INVENTION

FIG. 1 schematically shows a perspective view of an electrochemical system 1 with a first endplate 2, a second endplate 13 and a stack 14 with a plurality of bipolar plates 30, which are arranged between the endplates 2 and 13. A bipolar plate of the stack 14 which is closest to the endplate 2, is a first terminal bipolar plate 3. In the same way, a bipolar plate of the stack 14 located next to the endplate 13 is a second terminal bipolar plate 15. The stack 14 in addition comprises a plurality of membrane electrode assemblies, also referred to as MEA and gas diffusion layers, referred to as GDLs, which each are arranged between neighboring bipolar plates of the stack 14, so that the bipolar plates together with the MEA and the GDLs form a plurality of electrochemical cells.

In the present example, these electrochemical cells are hydrogen fuel cells connected in series. In alternative embodiments, the system 1 can also be realized as an electrochemical compressor or an electrolyzer. They do not differ with respect to their construction, but in particular with respect to the fluids supplied to and removed from the MEA as well as with respect to the production or supply of electrical current.

In the example of the hydrogen fuel cell, by oxidation of molecular hydrogen, release of electrodes to the anode, reduction of molecular oxygen and take up of electrodes at the cathode, an electrical voltage of up to 1 volt is produced between the anode and the cathode of the fuel cell, so that the fuel cell stack can be used as a source of direct current. The endplate 2 in addition comprises connectors 5. Via two of these connectors, molecular hydrogen as fuel and air or molecular oxygen as reaction gas can be supplied to the stack 14 and via two other of these connectors, the used reaction gases in mixture with the water produced during the reaction can be removed. Two further ones of the connectors 5 serve for the circulation of a coolant through the stack 14. In FIG. 1, the electrical connections via which an electrical load can be connected to the fuel cell stack 14 is not shown.

The bipolar plates of the fuel cell stack 14, in particular the terminal bipolar plates 3 and 15, are embossed metal parts from stainless steel with a coefficient of thermal expansion of $1.6 \cdot 10^{-5}$ $K^{-1}$. In contrast, the endplates 2 and 13 are made from a plastic material which has a coefficient of thermal expansion of $5.0 \cdot 10^{-5}$ $K^{-1}$. The terminal bipolar plates 3 and 15 thus each have a smaller coefficient of thermal expansion than the endplates 2 and 13, to which they adjoin. As a consequence, the endplate 2 and the terminal bipolar plate 3 adjoining to it in particular show a different change of their lateral extension in the x-y-plane orthogonal to the stack axis z, when the temperature of the endplate 2 and of the terminal bipolar plate 3 increases or decreases by the same amount. Given the different thermal expansion of the terminal bipolar plate 3 and the endplate 2, a shift of areas of the two plates 2 and 3 relative to each other occurs. This is however no absolute shift of the plates. Rather, the larger the distance of the areas of the plates from the center of mass of the terminal bipolar plate, the larger the lateral shift between these areas of the two plates 2 and 3 relative to each other occurs. The reasons for such changes in temperature may be a change of the environmental temperature, the cold start of the fuel cell system at low ambient temperature or the increase or decrease of the temperature inside of the fuel cell stack 14, e.g. due to reaction heat resulting from the conversion from chemical energy to electrical energy. Especially in the transition when a stack is started at very low or subzero conditions, the unequal thermal conductivity and/or thermal mass could lead to an asynchronous heating of the bipolar plate stack and the endplates. This intensifies the relative movement of terminal bipolar plate and the endplate.

In the present example, the endplate 2 and the terminal bipolar plate 3 are essentially square with a length of the edges in x- and y-direction of about 400 mm. During a change of the temperature of the terminal bipolar plate 3 and the endplate 2 from −40° C. to +100° C., thus with a temperature change by 140 K the induced change of the length of the endplate 2 in the x- or y-direction is about 2 mm larger than the change of the length of the terminal bipolar plate 3 in the same direction. This corresponds to about 5 permille of the length of the edges mentioned of 400 mm of the terminal bipolar plate 3. With this, the respective edge areas of the endplate 2 shift by about 1 mm relative to the edge areas of the terminal bipolar plate 3. This can have a negative impact to the sealing device of the system 1, as will be explained later on.

Figure 2A:
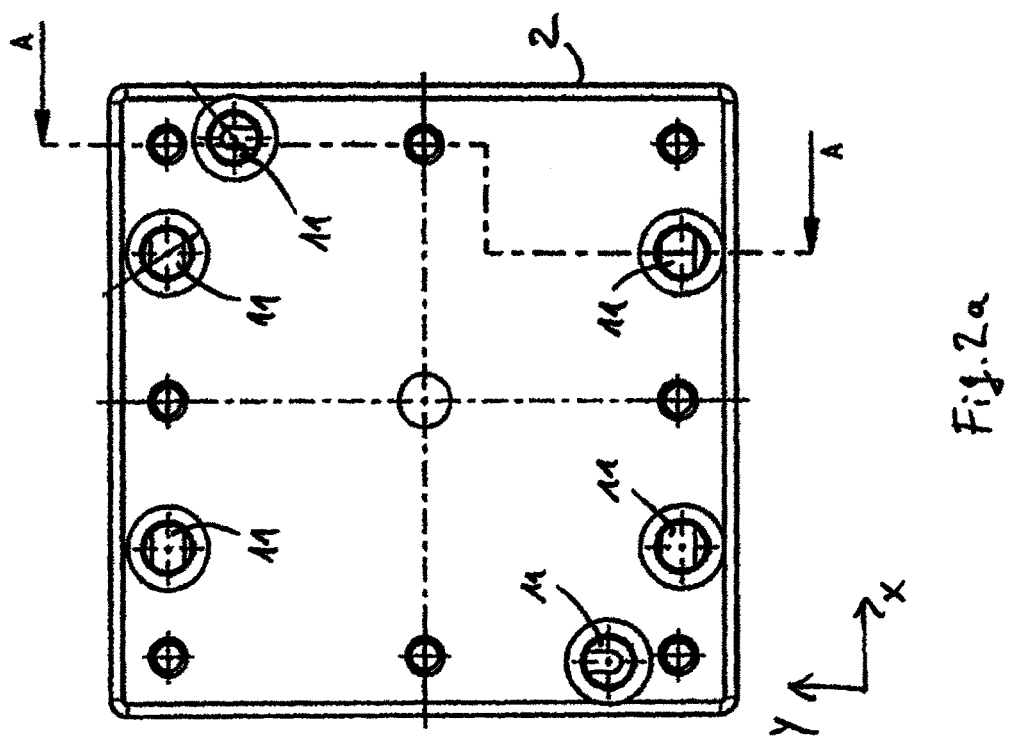

The FIGS. 2a to 2c show a top view of the endplate 2 in the x-y-plane (FIGS. 2a and 2c) and a sectional view in the y-z-plane (FIG. 2b), where FIG. 2b represents a section along the axis A-A in FIG. 2a. FIG. 2a here shows the outer surface of the endplate 2. In contrast, FIG. 2c shows the surface of the endplate 2 pointing towards the terminal bipolar plate. Element 21 shows the support area and the sealing area of the terminal bipolar plate, while 22 refers to the area of the current collector. It is obvious that the endplate 2 comprises passage bores 11, which extend along the thickness, thus along the z-axis through the endplate 2. The passage bores 11 each end in one of the connectors 5. The passage bores 11 shown in FIG. 2b comprise reinforcing inserts 12 made from metal, which do however not extend over the entire thickness of the endplate 2 along the z-axis. At least one of the passage bores 11 comprises no such reinforcing insert 12.

In FIG. 3, a perspective view of the terminal bipolar plate 3 is shown. On its surface pointing away from the endplate 2, it comprises meandering channels 9 in the electrochemically active area 6, in which e.g. hydrogen may be guided and supplied to the anode of a fuel cell. In addition, openings are visible which are in fluidic connection with the passage bores 11 of the endplate 2. The sealing of the terminal bipolar plate 3 is not explicitly shown here.

FIG. 4a extremely schematically shows the orientation of the endplate 2 relative to the terminal bipolar plate 3 prior to operation of the electrochemical system and thus the stack components at lower temperature. In contrast, FIG. 4b shows, again extremely schematically, the orientation of the endplate 2 relative to the terminal bipolar plate 3 after the operation temperature has been reached. It is obvious that both plates in FIG. 4b have expanded relative to FIG. 4a, but that the center of the plates is not shifted. The endplate 2, which consists from a material with a larger coefficient of thermal expansion than the terminal bipolar plate 3 protrudes beyond the outer edges of the terminal bipolar plate 3. As an alternative, the size of the plates relative to each other can also be designed in such a way that they have flush outer edges after warm-up, but that the outer edges of the terminal bipolar plate protrude beyond the outer edges of the endplate at low temperatures. One can also think about designs where the same lateral extension is given at medium temperature and where both at operation temperature and after cool-down a shifted arrangement of the outer edges is given.

In FIGS. 5a and 5b, an electrochemical system 101 according to the state of the art is shown. This illustration highlights the problems occurring with the systems known thus far which are overcome with the system proposed here.

The known system 101 shown in FIGS. 5a and 5b comprises an endplate 102 from plastic and a terminal bipolar plate 103 from metal comprised of two half plates 103a and 103b which terminal bipolar plate 103 is adjacent to the endplate 102. This terminal bipolar plate 103 in its area adjacent to the passage bores 111 extending through its size and through the endplate 102 comprises a circumferential bead 107. On the surface of the bead 107 facing the endplate, a screen printing is applied as the sealing device 104. The sealing device 104 aims for instance on sealing the passage bores 111 against neighboring areas of the system 101 and towards the outside. In FIG. 5a, the endplate 102 and the terminal bipolar plate 103 show a first relative orientation with respect to each other, characterized by the solid first positioning lines 117, which each correspond to the center of the bead or to its contact point on the endplate, which in the following is also referred to as reference point. In addition to the terminal bipolar plate 103, FIG. 5a shows the first bipolar plate 140 that follows the terminal bipolar plate 103 in the stack. This bipolar plate also comprises a bead 147 which on its surface facing the MEA 120 is provided with a comparable screen printing 104 as the terminal bipolar plate 103. Further, the current collector 110 situated between the endplate 102 and the terminal bipolar plate 103 as well as several gas diffusion layers (GDLs) 108, 188 are shown. The GDLs 108 represent gas diffusions layers where actually reaction media are guided while the GDL 188 represents a gas diffusion layer where no reaction takes place, namely in the interspace between the terminal bipolar plate 103 on the one hand and the current collector 110 and the endplate 102 on the other hand. In the latter case, the GDL 188 mainly aims on balancing the heights and conducting the electric current from the terminal bipolar plate to the current collector.

The same system 101 is shown in FIG. 5b after the terminal bipolar plate 103 with the sealing device 104 applied thereon has been brought into sealing contact with the endplate 102 and where both plates are in a second relative orientation, which is different from the first one shown in FIG. 5a. The centers of the beads and the reference points have been shifted relative to each other in FIG. 5b, as is indicated by two dashed positioning lines, namely the second positioning line 117b for the centers of the beads and the second positioning line 117a for the reference points. It is obvious that the edge portions of plates 102 and 103 in the second relative orientation of FIG. 5b have shifted in x-direction relative to the first orientation given in FIG. 5a, too, e.g. by up to 1 mm. The reason for this shift is typically the different thermal expansion of the endplate 102 made from plastics and of the terminal bipolar plate 103 made from metal during a temperature increase, which has been described beforehand. The outer edges of the plates have shifted in the same way, as is easy to recognize. Given the total size of the plate relative to the shifts, it is not visible that the relative shift on the left side of the passage bore 111 is slightly higher than on the right side of the passage bore 111. During cool down, a corresponding contraction and shift in the opposite direction occurs. In the situation shown in FIG. 3b, the relative shift of the plates 102 and 104 causes that the sealing device 104 sticks to the endplate from plastics and during the many repeated temperature changes is displaced from the bead 107 of the terminal bipolar plate 103. The relative shifts of the reference points 117a then also shifts it away from the bead 107. As a consequence, the sealing device 104 is no longer able to fulfill its required sealing function.

In order to overcome this problem described in the context of FIGS. 5a and 5b, here, an electrochemical system with an improved sealing device is proposed, which is further described with the following FIGS. 6 to 9.

FIGS. 6a and 6b schematically show a detailed view of the system 1 according to the invention, which has already been shown in FIG. 1. In particular, it illustrates the endplate 2 from plastics and the terminal bipolar plate 3 from stainless steel adjoining to the endplate 2 in the area of one of two passage bores 11, 11' of the endplate 2 as well as a MEA 20 and a further bipolar plate 40 adjoining to the MEA 20 on the opposite side of the terminal bipolar plate 3. A large part of the electrochemically active area 6, thus of the flow field, is not shown. In the area around these passage bores 11, 11' or around the port 25, 25' belonging to this passage bores 11, 11', the terminal bipolar plate 3 in each case shows a bead 7. In the x-y-plane, the bead may form a closed structure, e.g. as a ring or a frame. As is obvious, each of the ports 25, 25' is surrounded by such a bead 7. On a surface of the beads 7 facing the endplate 2, a one-layered coating 4'a forming part of a sealing device 4 according to the invention has been applied. Here, the coating 4'a is a screen printed micro seal with improved sliding properties according to the invention. The beads 7 and the channels 9 are embossed in the terminal bipolar plate 3 and therefore one-piece with the stainless steel sheet it is made from. For the improvement of the sliding ability of the coating 4'a, the coating 4'a comprises silicon oil. As an alternative, the coating 4'a may also comprise additives such as graphite, PTFE, waxes, fluorinated waxes, silicones or combinations of these, in order to improve its sliding behavior. Here, the coating 4'a is printed, laminated or glued on the surface of the terminal bipolar plate 3 facing the end plate 2, in particular on the surface of the bead 7 pointing towards the endplate 2. In slightly different embodiments, the coating 4'a can also be realized as a polymer film, which comprises e.g. PTFE, PI Kapton® and/or polyester. Coatings 4'a, which comprise a fluoropolymer, graphite or $MoS_2$ as a sliding-improving additive; they may form part of the sealing device 4. In contrast, the coating 24 on the surface of the bead 7 in the lower half plate 43b, thus facing the MEA 20, as well as on the beads 47 in the bipolar plate 40 is a coating without a sliding-enhancing additive and therefore may for instance correspond to the coatings 104 used in the state of the art.

As a further part of the sealing device 4, a surface of the endplate 2 which faces the terminal bipolar plate 3 optionally further comprises a structuring 4". This structuring 4" is at least given in that part of the surface of the endplate 2 facing the terminal bipolar plate 2, which is in contact or brought into contact with the coating 4'a of the terminal bipolar plate 3 in order to form the sealing device 4. The structuring 4" has been produced by an abrasive method, in the present example for instance by grinding. In alternative embodiments, the structuring can also be achieved by lapping, polishing and/or honing. With the structuring 4" the friction coefficient of the surface of the endplate 2 is reduced in the area of the structuring. With this, the sliding behavior of the coating 4'a on the surface of the endplate 2 is increased.

The sealing device 4 arranged between the endplate 2 and the terminal bipolar plate 3 in the stack direction, thus the z-direction, extends around the passage bores 11, 11' and encircles the latter ones, so that the passage bores 11, 11' and the ports 25, 25' relating the passage bore 11 can be sealed or are sealed at least in the x-y-plane, thus orthogonal to the drawing plane of FIGS. 6a and 6b against surrounding areas of the system 1 and towards the outside. Here, the sealing device 4 only extends partially over the surface of the terminal bipolar plate 3 pointing towards the endplate 2. In alternative embodiments, the sealing device may also extend completely or almost completely over the surface of the terminal bipolar plate 3 facing the endplate 2. The sealing device 4 here in its entirety is arranged at or on the surface of the terminal bipolar plate 2 pointing towards the endplate 2, but does not reach through the endplate 3.

In addition, current collector plates 10 made in part or entirely from metal as well as a further element 88 are arranged between the endplate 2 and the terminal bipolar plate 3. The current collector plate 10 establishes the electrical contact between the electrochemical cells of the stack 14 and the corresponding connections of the endplate 2, which here are not explicitly shown. The current collector plate 10 may be in electrical contact with e.g. the terminal bipolar plate 3, which is not shown here. The further element 88 mainly serves for an adaptation of the height and compression force in the stack direction, thus in z-direction. The further element 88 may for instance be made from the material of a gas diffusion layer or a similar material. Comparable gas diffusion layers 8 are also used adjacent to the MEA 20 of the stack 14, as is visible on the lower side of the terminal bipolar plate 3 and on both sides of the additional bipolar plate 40. One can further identify the channels 9 in the electrochemically active area 6 on the backside of the terminal bipolar plate 3 pointing away from the endplate 2, which have already been shown in FIG. 3. Comparable channels 9 are given on both surfaces of the additional bipolar plate 40. In contrast, the channel-like structures on the surface of the terminal bipolar plate 3 facing the endplate 2 guide no reaction medium. This is in line with the passages 41, 42 through the beads 7, 47: While a first medium, here hydrogen, is supplied via the port 25 and the bead passage 42 to the channels 9 on the upper side of the bipolar plate 40, the second medium, here air, is supplied via the port 25' and the bead passages 41 to the channels 9 on the lower side of the terminal bipolar plate 3 and on the lower side of the bipolar plate 40. The cavities 19 inside the bipolar plate 40, thus between both half plates 43a, 43b form a flow field for coolant, here water with anti-freeze additives. Given the embossed metal sheet parts, the channels 9 and 19 are in positive-negative relationship.

In FIG. 6a, the endplate 2 and the terminal bipolar plate 3 are in a first relative orientation with respect to each other, which is characterized by solid positioning lines 17, which again correspond to the respective center of the bead or reference point on the endplate. In FIG. 6b, the same system 1 as in FIG. 6a is shown, but after the terminal bipolar plate 3 with the coating 4'a applied to it have been brought into tight contact with the endplate 2 and with the two plates showing in a second relative orientation which is different from the first relative orientation. This second orientation in FIG. 6b is indicated by small dashed positioning lines 17b indicating the center of the bead and by thicker dashed positioning lines 17a indicating the aforementioned reference point. It is obvious that the two plates 2 and 3 in their second relative orientation given in FIG. 6b have shifted along the x-direction relative to the first relative orientation given in FIG. 6a. Only half of the total shift of e.g. up to 2 mm, is attributed to each individual outer edge of the stack. Here again, the reason for this shift lies with the different thermal expansion of the endplate 2 made from plastics and the terminal bipolar plate 3 made from stainless steel under temperature changes.

Other than in the situation described in the context of FIG. 5b, where the sealing device as a consequence of the relative shifts of the endplate 102 and the terminal bipolar plate 103 is displaced from the terminal bipolar plate and is detached from the bead, the sealing device 4 according to the invention, which in the example of FIGS. 6 and 6b comprises the coating 4'a and the structuring 4", makes is possible that the sealing function of the sealing device 4 is maintained throughout sliding of the endplate 2 and the terminal bipolar plate 3 with reduced frictional force along the sealing device 4 without a deformation of the coating 4'a or a release and removal of the coating from the bead 7. Here, the sealing device is realized in such a way that the endplate 2 and the terminal bipolar plate 3 are in sliding contact via the sealing device 4. Compared to the known systems, the longevity and reliability of the sealing device this way are considerably improved.

FIGS. 7a and 7b show a variant of the embodiment of the system 1 according to the invention shown in FIGS. 6a and 6b. With respect to the representation it is different from FIGS. 6a and 6b in that only the part corresponding to the area surrounded with a broken rectangle A in FIG. 6a is shown. The other following drawings are limited to this area, too. With respect to the technical details, it is only different from the system shown in FIGS. 6a and 6b in that the coating 4'a is applied on the surface of the endplate 2 facing the terminal bipolar plate 3 and that the surface of the bead 7 pointing towards the endplate 2 comprises the aforementioned structuring. The coating 4'a and the structuring 4" in the FIGS. 7a and 7b can be characterized and realized or produced in the same way as described in the context of FIGS. 6a and 6b. In the variant given in FIGS. 7a and 7b, the endplate 2 and the terminal bipolar plate 3 are in sliding arrangement and sealing contact with each other via the sealing device 4 according to the invention.

A further variant of the sealing device 4 is shown in FIGS. 8a/8b on the one hand and 8c/8d on the other hand. In both cases, the sealing device comprises a coating with two layers 4'a and 4'b, which are arranged in z-direction between the endplate 2 and the terminal bipolar plate 3. Here the layer 4'a again is screen printed. In FIGS. 8a and 8b, it is arranged on the surface of the bead 7 facing the endplate and in FIGS. 8c and 8d on the surface of the endplate 2 facing the terminal bipolar plate 4. In FIGS. 8a and 8b, the additional layer 4'b is printed, glued or laminated on the layer 4'a. In FIGS. 8c and 8d, the additional layer 4'b is printed, glued or laminated to the layer 4'a. The additional layer 4'b may be a sliding layer, which for instance again comprises graphite, $MoS_2$ or a fluoropolymer. The layer 4'b may also be a polymer film, which comprises PI Kapton®, PTFE or polyester.

In FIGS. 8a/8b, the area of the surface of the endplate 2 facing the terminal bipolar plate 3, which is in contact with the layer 4'b or is to be brought into contact with the layer 4'b in order to form the sealing device 4 is provided with a structuring 4" of the kind described beforehand. In the same way the area of the surface of the bead 7, which points towards the endplate 2 is preferably additionally structured in a comparable way, see reference number 4" in FIGS. 8c/8d, in order to form the sealing device 4 which is in contact with the layer 4'b or is to be brought into contact with the layer 4'b. Together the layers 4'a and 4'b and if given, the structuring 4", too, form the sealing device 4 according to the invention. Here, the optional structuring mentioned, which may be realized by grinding, lapping, polishing, electropolishing and/or honing, causes a reduction of the sliding friction against the layer 4'b.

A further embodiment of the system 1 according to the invention is shown in FIGS. 9a and 9b. Here again, the sealing device 4 according to the invention comprises the micro sealing 34 printed onto the surface of the bead 7 facing the endplate 2. This micro sealing 34 consists in elastomers such as for example NBR, HNBR, EPDM, FPM or comparable rubbers and usually does nor comprise any explicit sliding additives in the sense of the present invention. The micro sealing 34 with respect to its composition may thus correspond to the coating 104 mentioned in the context of the state of the art. In addition, the sealing device 4 comprises a sealing element 4'''a, which at least is partially inset into a recess 18 on the surface of the endplate 2 pointing towards the terminal bipolar plate 3. The recess 18 may be realized as a groove or a channel. Here, the recess encircles the passage bore 11. The recess may form a closed loop in the x-y-plate, e.g. as an annular groove. The sealing element 4'''a preferably is realized as a polymer-based sealing system, e.g. as a sealing ring, tangential rings or a chain of rings. The sealing element 4'''a may be inserted into the recess 18 or molded into the recess 18. In the examples of FIGS. 9a and 9b, the sealing device 4 further comprises a metallic intermediate plate 4'''b, which is arranged in z-direction between the endplate 2 and the terminal bipolar plate 3, in particular between the sealing element 4'''a and the micro sealing 34. It is preferred that the coefficient of thermal expansions of the material of the intermediate plate 4'''b is equal to or essentially equal to the coefficient of thermal expansion of the material of the terminal bipolar plate 4. They may for instance show a difference in coefficient of thermal expansion of at the most 10 percent or, more preferred, at the most 5 percent.

The sealing element 4'''a is arranged on the intermediate plate 4'''b and/or the intermediate plate 4'''b is arranged between the sealing element 4'''a and the micro sealing 34 in such a way that sliding between the sealing element 4'''a and the intermediate plate 4'''b is possible transversely to the z-axis. Given the comparable coefficients of thermal expansion of the materials from which the intermediate plate 4'''b and the terminal bipolar plate 3 are formed, no lateral shift of the micro sealing 34 relative to the bead of the intermediate plate 4'''b occurs in spite of the sliding shift of the sealing element 4'''a relative to the intermediate plate 4'''b. With this, a sticking of the micro sealing 34 on the adjacent intermediate plate 4'''b is prevented and this way a displacement of the micro sealing 34 from the sealing bead 7 is constantly inhibited. The sealing device 4 thus comprises at least the sealing element 4'''a, the intermediate plate 4'''b and the micro sealing 34, preferably additionally the recess 18. Here again, the endplate 2 and the terminal bipolar plate 3 are in tight contact through the sealing device and arranged in a manner which enables sliding, given the sliding arrangement between the sealing element 4'''a and the intermediate plate 4'''b. The sealing between the intermediate plate 4'''b and the endplate 2 is preferably realized via the sealing element 4'''a, with the sealing element 4'''a being in force bypass.

The sealing device 4 according to the invention is realized in such a way that it maintains its sealing functions in a reliable manner during a large amount of temperature changes, if the relative shift of the terminal bipolar plate 3 and the endplate 2 corresponds to up to 8 permille of the largest extension of the terminal bipolar plate 3 in the x-y-plane.

BEZUGSZEICHENLISTE/LIST OF REFERENCE SIGNS 1 elektrochemisches System—electrochemical system
2 erste Endplatte—first endplate
3 erste Abschlussbipolarplatte—first terminal bipolar plate
4 Dichtvorrichtung (generell)—sealing device (in general)

4'*a* Dichtvorrichtung (als einlagige Beschichtung)
Sealing device (as one-layered coating)
4'*a*, 4'*b* Dichtvorrichtung (als mehrlagige Beschichtung)
Sealing device (as multi-layered coating)
4'' Dichtvorrichtung (als Strukturierung der Endplatte u/o der Abschlussbipolarplatte)
Sealing device (as structuring of the endplate and/or the terminal bipolar plate)
4'''*a* Dichtvorrichtung (hier: Dichtelement O-Ring)
Sealing device (here: sealing element O-ring)
4'''*b* Dichtvorrichtung (hier: Dichtelement in Form von Zwischenplatte)
Sealing device (here: sealing element formed as an intermediate plate
5 Port als Anschluss in der Endplatte—connector
6 elektrochemisch aktiver Bereich/Flowfield
electrochemically active area/flowfield
7 Sicke der Abschlussbipolarplatte—bead of the terminal bipolar plate
8 Gasdiffusionslage als solche—gas diffusion layer as such
9 Kanäle der Abschlussbipolarplatte—channels of the terminal bipolar plate
10 Stromabnehmerplatte (eingesetzt in rahmenförmige Zwischenplatte)
Current collector (inserted into a frame-shaped intermediate plate)
11 Durchgangsbohrung—passage bore
12 Verstärkungseinsatz—reinforcing insert
13 zweite Endplatte—second endplate
14 Brennstoffzellenstapel—fuel cell stack
15 zweite Abschlussbipolarplatte—second terminal bipolar plate
16 Öffnungen—openings
17 Positionslinien—positioning lines
18 Vertiefung—recess
19 Kühlmittelkanal—coolant channel
20 MEA—MEA
24 Beschichtung ohne Gleitzusatz—coating without sliding-enhancing additive
25, 25' Port—port
34 Mikroabdichtung—micro sealing
40 Bipolarplatte—bipolar plate
41, 42 Sickendurchführungen in den Bipolarplatten—bead passages in the bipolar plates
43*a*, 43*b* Halbplatten—half plates
47 Sicke der Bipolarplatte—bead of the bipolar plate
88 Gasdiffusionslage ohne darin verteilten Reaktand—gas diffusion layer without
reaction medium distributed inside.

The invention claimed is:

1. An electrochemical system, comprising
at least one endplate,
a terminal bipolar plate as well as a first sealing device arranged between the endplate and the terminal bipolar plate,
with the materials of the terminal bipolar plate and the endplate having different coefficients of thermal expansion and with the first sealing device being designed in such a way that during temperature changes, the sealing function between the first sealing device and the endplate is also given by a sliding of the endplate and/or the terminal bipolar plate along the first sealing device; and
a penultimate bipolar plate adjacent the terminal bipolar plate with a second sealing device arranged between the penultimate bipolar plate and the terminal bipolar plate wherein the second sealing device is different than the first sealing device.

2. The electrochemical system according to claim 1, wherein the sealing device is arranged in an area around a port and/or around an electrochemically active area of the terminal bipolar plate.

3. The electrochemical system according to claim 1, wherein elements of the sealing device extend completely or partially over the surface of the endplate and/or the terminal bipolar plate.

4. The electrochemical system according to claim 1, wherein the sealing device is designed in such a way that it does not reach through the entire thickness of the endplate.

5. The electrochemical system according to claim 1, wherein the sealing device is realized as a one- or multilayered coating of the endplate and/or the terminal bipolar plate.

6. The electrochemical system according to claim 5, wherein the material of the coating comprises a laminated film or glued polymer film, wherein the laminated film or the glued polymer film comprises fluoropolymers.

7. The electrochemical system according to claim 6, wherein the coating is screen-printed coating, or a roll-printed coating, or a spray coated coating.

8. The electrochemical system according to claim 7, wherein the coating comprises sliding-enhancing additives including graphite, PTFE, $MoS_2$, and fluorinated waxes.

9. The electrochemical system according to claim 6, wherein the coating is a polymer film comprising PTFE, PI, and/or polyester.

10. The electrochemical system according to claim 1, wherein the sealing device is an ablated structuring of the endplate and/or of the terminal bipolar plate made by grinding, lapping, polishing, electropolishing and/or honing.

11. The electrochemical system according to claim 1, wherein the sealing device comprises a sealing element inset into the endplate and additionally comprises an intermediate plate, which is arranged in such a way that the intermediate plate is arranged in a sliding manner on this sealing element wherein the intermediate plate is arranged between the terminal bipolar plate and the endplate.

12. The electrochemical system according to claim 11, wherein the coefficient of thermal expansion of the intermediate plate is identical or essentially identical to the coefficient of thermal expansion of the terminal bipolar plate.

13. The electrochemical system according to claim 11, wherein the sealing between the intermediate plate and the endplate is realized with a sealing system that is molded-in and/or inserted.

14. The electrochemical system according to claim 11, wherein the intermediate plate extends over the entire surface of the terminal bipolar plate or is a frame.

15. The electrochemical system according to claim 1, wherein the coefficient of thermal expansion of the terminal bipolar plate is smaller than the coefficient of thermal expansion of the endplate.

16. The electrochemical system according to claim 11, wherein the sealing device is designed in such a way that in the direction of the largest lateral extension of the endplate a lateral adjustment of up to 8 permille of the length of said lateral extension is possible by a sliding in the area of a contact zone between terminal bipolar plate and sealing device while maintaining a sufficient sealing function.

17. The electrochemical system according to claim 1, wherein the sealing device is designed in such a way that it can be brought into contact with a bead of the terminal bipolar plate.

18. The electrochemical system according to claim 1, wherein at least one element is arranged in an area of electrochemically active area of the cells between the endplate and the terminal bipolar plate for the adjustment of the height and/or the transmission of compression force in stack direction.

19. The electrochemical system according to claim 1, wherein an intermediate plate, a current collector plate and/or the terminal bipolar plate are comprised of metal.

20. The electrochemical system according to claim 1, wherein the endplate comprises passage bores for the supply of fluids and/or coolant to the terminal bipolar plate.

21. The electrochemical system according to claim 20, wherein at least one of these passage bores comprises no reinforcing insert.

22. The electrochemical system according to claim 20, wherein at least one of these passage bores comprises a reinforcing insert, with the reinforcing insert not extending over the complete height of the endplate.

23. The electrochemical system according to claim 1, wherein the electrochemical system is a fuel cell system, an electrochemical compressor system or an electrolyzer.

24. The electrochemical system of claim 1, wherein the second sealing device lacks a sliding enhancing additive.

\* \* \* \* \*

UNITED STATES PATENT AND TRADEMARK OFFICE
CERTIFICATE OF CORRECTION

PATENT NO. : 10,147,958 B2
APPLICATION NO. : 15/117986
DATED : December 4, 2018
INVENTOR(S) : Bernd Gaugler et al.

Page 1 of 1

It is certified that error appears in the above-identified patent and that said Letters Patent is hereby corrected as shown below:

In Claim 1, Column 15, Line 63 the word "also" should be deleted.

Signed and Sealed this
Twenty-sixth Day of March, 2019

Andrei Iancu
*Director of the United States Patent and Trademark Office*